(12) United States Patent
Bardouillet et al.

(10) Patent No.: US 7,774,615 B2
(45) Date of Patent: Aug. 10, 2010

(54) INTEGRITY CONTROL OF A MEMORY EXTERNAL TO A PROCESSOR

(75) Inventors: Michel Bardouillet, Rousset (FR); Claude Anguille, Bouc Bel Air (FR); Joan Daemen, Overpelt (BE)

(73) Assignees: STMicroelectronics S.A., Montrouge (FR); Proton World International N.V., Zaventem (BE)

( * ) Notice: Subject to any disclaimer, the term of this patent is extended or adjusted under 35 U.S.C. 154(b) by 1127 days.

(21) Appl. No.: 11/431,328

(22) Filed: May 10, 2006

(65) Prior Publication Data
US 2006/0253708 A1 Nov. 9, 2006

(30) Foreign Application Priority Data
May 10, 2005 (FR) ................................. 05 51199

(51) Int. Cl.
*G06F 11/30* (2006.01)
*G06F 21/00* (2006.01)
(52) U.S. Cl. ...................... 713/187; 713/193
(58) Field of Classification Search .......... 713/187, 713/176, 180, 161
See application file for complete search history.

(56) References Cited
U.S. PATENT DOCUMENTS

| 6,925,566 | B1 * | 8/2005 | Feigen et al. ............ 713/187 |
| 2004/0186994 | A1 | 9/2004 | Herbert et al. |
| 2005/0125681 | A1 | 6/2005 | Bressy et al. |
| 2006/0156005 | A1 * | 7/2006 | Fischer et al. ............ 713/176 |

FOREIGN PATENT DOCUMENTS

FR 2 810 425 A1 12/2001

OTHER PUBLICATIONS

French Search Report from French Patent Application 05/51199, filed May 10, 2005.

* cited by examiner

*Primary Examiner*—Gilberto Barron, Jr.
*Assistant Examiner*—Virginia Ho
(74) *Attorney, Agent, or Firm*—Lisa K. Jorgenson; William R. McClellan; Wolf, Greenfield & Sacks, P.C.

(57) ABSTRACT

A method for recording at least one block of variable data in a first volatile memory external to a microprocessor, including calculating and storing a digital signature taking into account at least partially the address and the content of said data block in the memory, and at least a first random digital value internal to the microprocessor.

22 Claims, 2 Drawing Sheets

INTEGRITY CONTROL OF A MEMORY EXTERNAL TO A PROCESSOR

BACKGROUND OF THE INVENTION

1. Field of the Invention

The present invention generally relates to electronic circuits and, more specifically, to microprocessors operating an external memory. "External memory" is used to designate a memory connected to the processor by communication buses accessible, for example, to a possible hacker.

The present invention more specifically relates to the checking of the integrity (absence of modification between their writing and their reading) of data contained in an external volatile memory for processing by a microprocessor.

2. Discussion of the Related Art

FIG. 1 is a block diagram of an architecture of the type to which the present invention applies. A microprocessor 1 comprises, among others, a central processing unit 11 (CPU) and, in the field of application of the present invention, an element 12 (CHECK) for checking the integrity of data read by the microprocessor from a memory 13 outside of circuit 1. Microprocessor 1 communicates with memory 13 (and other elements not shown) over several buses 14, among which an address bus 141, a data bus 142, and a control bus, not shown. Memory 13 is a RAM, called working memory, in which are stored data enabling the microprocessor to execute a program. These may be variables written and read by processor 1 in an operation session, or program instructions transiting through this work memory from a ROM (not shown) for execution thereof. It is considered that central processing unit 11 and integrity controller 12 are in a secure area (SECURE) of the microprocessor, that is, the data transiting through this area (or remaining within said area) need not be checked as to their integrity. However, memory 13 is considered in a non-secure or open environment (OPEN), which justifies the need to check that data which have been written into memory 13 are effectively identical on reading thereof.

A difference between the written and read data may originate either from a fraud attempt by a possible hacker, or from an incidental malfunction. In both cases, it is useful for microprocessor 1 to be able to detect that the data that it is about to process do not correspond to those that it expects.

A first known solution to check the integrity of the content of a memory read by a microprocessor is known as a CRC (Cyclic Redundancy Check) and comprises the storing, with the content of a block in the memory, of a value representative of this content. This value is then checked on reading to detect possible errors in the memory block content. Such a solution may be efficient to detect incidental errors but is not efficient against a possible hacking, since it is enough for the hacker to know the calculation mode of the value representative of the content to be able to force the system with erroneous data, coming along with a value that the hacker will have himself calculated and which will be admitted by the system.

A second known solution comprises the ciphering of the entire memory content by means of a ciphering algorithm executed by the microprocessor. On reading, the data extracted from the memory are then deciphered by the microprocessor. Such a solution does not prevent the introduction of erroneous data, for example, on a fraud attempt by fault injection into the program execution, since the data or instructions will anyway be deciphered by the processor.

A third solution is based on a calculation of message authentication codes (MAC) or digital signatures, and comprises the calculation of the result of a block ciphering algorithm exploiting, among others, a secret value known by the sole microprocessor.

FIG. 2 very schematically illustrates in the form of blocks the operation of an example of an integrity controller 12 of this type, on writing of a program block (CODE) into memory 13. For simplification, the central processing unit and other microprocessor components have not been shown in FIG. 2.

FIG. 3 illustrates the operation of such an integrity controller on reading of a program block (CODE) from this same memory.

Integrity controller 12 comprises an element 21 (MAC FCT) for calculating an authentication code (signature) MAC from the content CODE of the memory block, its physical address ADDRESS of storage into memory 13, and a key KEY. The address of storage in memory 13 is read from address bus 141 (ADD) and stored, for example, in a temporary register 22 of the integrity controller. The data block to be stored at this address is read from data bus 142 (DATA) and is temporarily stored, for example, in one or several registers 23 of the integrity controller. Key KEY comes from circuits internal to the microprocessor and corresponds, for example, to a secret key modified for each new session (new execution) of the program.

In write mode (FIG. 2), the integrity controller calculates, from the address, the block to be stored, and the key, a code MAC and this code is stored in memory 13 at the same time as the actual code.

On reading (FIG. 3), integrity controller 12 recalculates an authentication code MAC from the read address, the content of the block read from the memory, and the key, then compares (comparator 24—COMP) this code MAC with that contained in memory 13. The result of this comparison provides an indicator (ICF or Integrity Check Flag) to the central processing unit (11, FIG. 1) enabling said unit to take the appropriate measures in case of a voluntary or involuntary error. Said measures are, for example, a blocking of integrated circuit 1, an erasing of the secret data contained in circuit 1, etc.

The above description is functional and the integrity controller is in practice a program executed by the microprocessor by using its usual operators and registers. In particular, the respective sizes of registers 22 and 23 depend on the rapidity of processing of the integrity controller with respect to the needs of the central processing unit. Said registers generally are banks of FIFO-type registers.

A disadvantage of the solution described in relation with FIGS. 2 and 3 is that it is, in practice, dedicated to the checking of the integrity of program instructions and remains unprotected for variable data. Indeed, while the double execution of a code line by a possible attacker is not advantageous in terms of discovery of secret values, the fact of applying, several consecutive times, the same data to an algorithm may enable a hacker to exploit the results to hack certain data. Such is for example the case for a counter value stored in a memory external to the microprocessor. Such a counter used in a loop of an algorithm that a hacker attempts to pirate enables him to force the program to remain in the loop. A lack of integrity will not be detected since the counter value and its signature read from the memory are correct.

SUMMARY OF THE INVENTION

The present invention aims at overcoming all or part of the disadvantages of known methods and devices for controlling the integrity of the content of a memory external to a microprocessor.

The present invention more specifically aims at providing a solution which enables checking both the integrity of the variable data stored in the external memory and of fixed data (for example, instructions of a program) stored in this memory.

The present invention also aims at providing a solution which is compatible with usual authentication code calculation algorithms (MAC or the like).

The present invention also aims at providing a solution which is particularly well adapted to a RAM-type external memory.

The present invention further aims at providing a solution compatible with the use of session keys in the execution of a program by the microprocessor.

To achieve all or part of these objects, as well as others, the present invention provides a method for recording at least one block of variable data in a first volatile memory external to a microprocessor, comprising the calculation and storage of a digital signature taking into account:

at least partially the address and the content of said data block in the memory; and at least a first random digital value internal to the microprocessor.

According to an embodiment of the present invention, a digital signature of at least one block of non-variable data to be stored in the first memory takes into account, instead of said first value, at least one second fixed digital value.

According to an embodiment of the present invention, said random value is randomly generated on each updating of said variable data block in the first memory.

According to an embodiment of the present invention, said random value is stored in volatile fashion in the microprocessor.

According to an embodiment of the present invention, said signature is stored, with said data block, in the external memory.

According to an embodiment of the present invention, said signature is stored in volatile fashion in the microprocessor.

According to an embodiment of the present invention, said signal further takes into account a digital key modified for each new session of a same program executed by the microprocessor and/or for each initialization thereof.

The present invention also provides a method for checking the content of at least one data block read from a volatile memory external to a microprocessor, comprising the comparing of a signature stored on recording of said block with a current signature.

The present invention also provides a microprocessor comprising signature calculation means for storing a data block in a volatile memory external to the microprocessor.

The foregoing and other objects, features, and advantages of the present invention will be discussed in detail in the following non-limiting description of specific embodiments in connection with the accompanying drawings.

DETAILED DESCRIPTION

Figure 1:
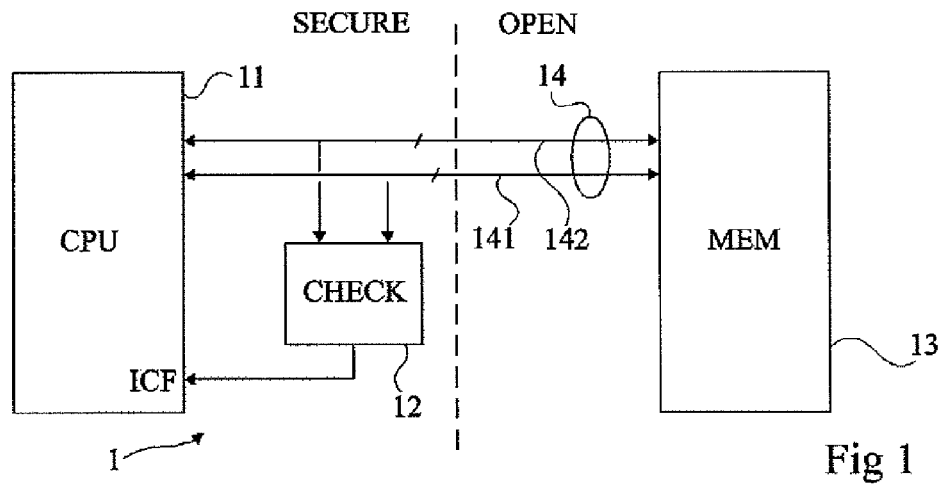
FIG. 1, previously described, shows an example of a conventional microprocessor and external memory architecture of the type to which the present invention applies.

The same elements have been designated with the same reference numerals in the different drawings. For clarity, only those method steps and circuit elements which are useful to the understanding of the present invention have been shown in the drawings and will be described hereafter. In particular, the details constitutive of the microprocessor have not been shown in detail, the present invention being compatible with any conventional microprocessor. Similarly, the systems for addressing and exploiting data read from or written into an external memory by a microprocessor have not been described in detail, the present invention being here again compatible with conventional systems.

A feature of an embodiment of the present invention is to make a signature or fingerprint (authentication code) associated with a variable to be stored in a memory external to a microprocessor, dependent from a random value held by the microprocessor.

Another feature of an embodiment of the present invention is to generate this random value on each requested updating of the same block in the external memory.

Figure 2:
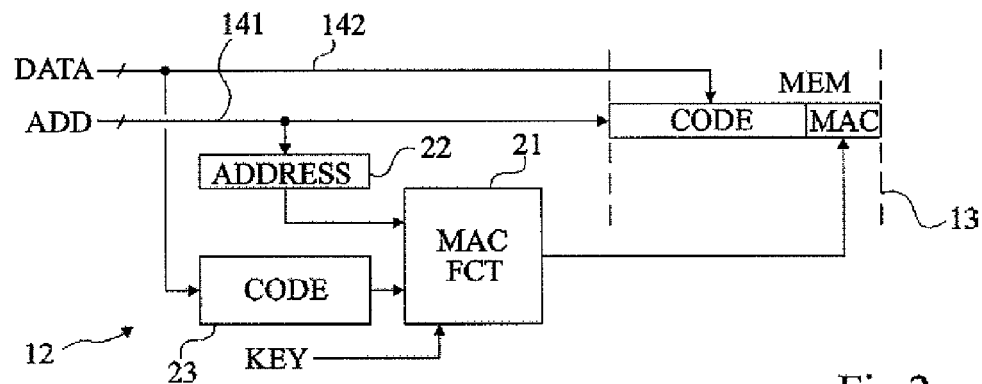
FIG. 2 very schematically illustrates the operation in write mode of an example of a conventional integrity controller.
Figure 4:
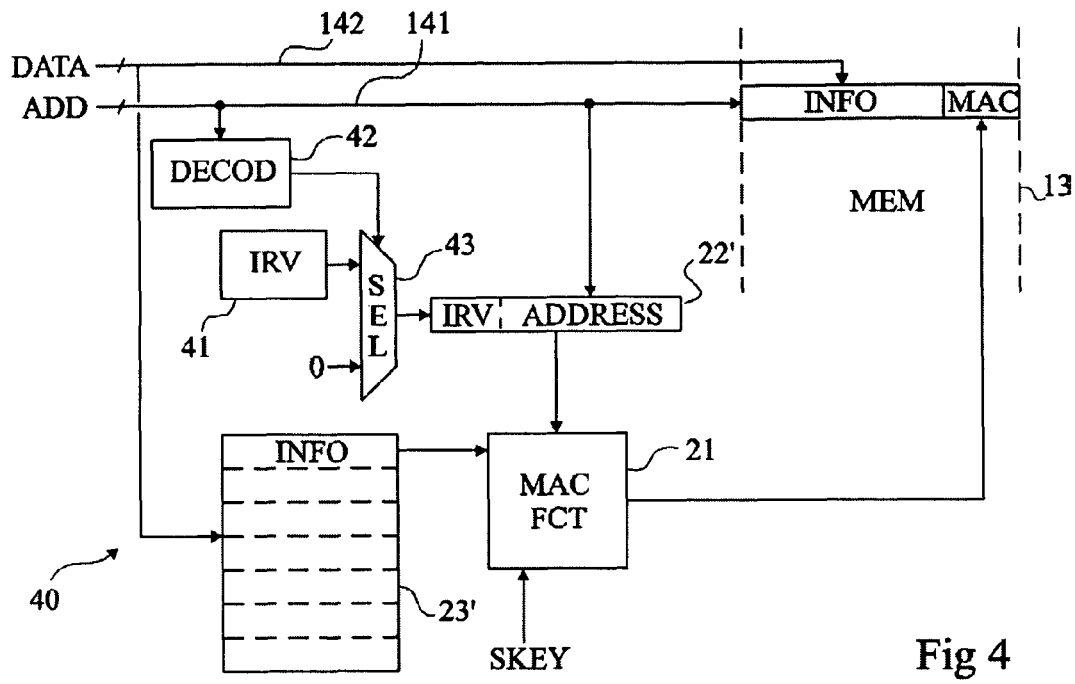
FIG. 4 very schematically illustrates in the form of blocks the operation of an embodiment of an integrity controller in data write mode in a memory external to a microprocessor according to the present invention.

FIG. 4 very schematically illustrates in the form of blocks, in a view to be compared with that of FIG. 2, a functional embodiment of an integrity controller 40 according to the present invention in a phase of data writing into a volatile memory 13 (MEM) external to a microprocessor. For simplification, only memory 13 and functional elements 40 of the integrity controller of the microprocessor have been shown.

As previously, the integrity check provided by the present invention operates an element 21 of calculation of an authentication code (MAC FCT) or more generally of a fingerprint or signature taking into account, at least partly, the content of data block INFO to be stored in memory 13 and its physical address (ADDRESS) in this memory 13. Address (or address portion) ADDRESS is extracted from an address bus 141 (ADD) and data block INFO (or the block portion) is extracted from a data bus 142 (DATA), both connecting at least the microprocessor to the memory. Data blocks INFO and addresses ADDRESS transit, as previously, through temporary registers 22' and 23' of the microprocessor.

Preferably, fingerprint calculation 21 also takes into account a key SKEY, for example, a session key which changes on each new execution of the same program or on each resetting of the microprocessor.

According to this embodiment of the present invention, fingerprint calculation function 21 also takes into account, when data INFO of the block are variable data, an internal random value (block 41 IRV). In the case where data INFO of the block are instructions (code) of a program, this random value is, preferably, not taken into account. For this purpose, an element 42 (DECOD) detects, from the address present on bus 141, whether the addressed memory area corresponds to program code or to variables exploited by this program. The result of this decoder 42 is used to select one out of two inputs of a selector 43 (SEL) between random value IRV and a fixed value (for example, 0). The value selected by element 43 is, for example, stored in temporary address register 22' for exploitation by circuit 21.

Random value IRV is stored by the microprocessor in an internal memory. This value changes, preferably, on each new writing of a same variable into memory 13. Several values IRV can thus need storage by the microprocessor, for example, in internal volatile registers, with an identification of the concerned variable (or of its address if said address is fixed) to be able to control the integrity on reading. As a variation, only variables considered as critical from the point regarding the integrity control are considered as data to which a random value is desired to be assigned by decoder 42, the other variables being processed as instructions (with the taking into account of the fixed value).

Figure 3:
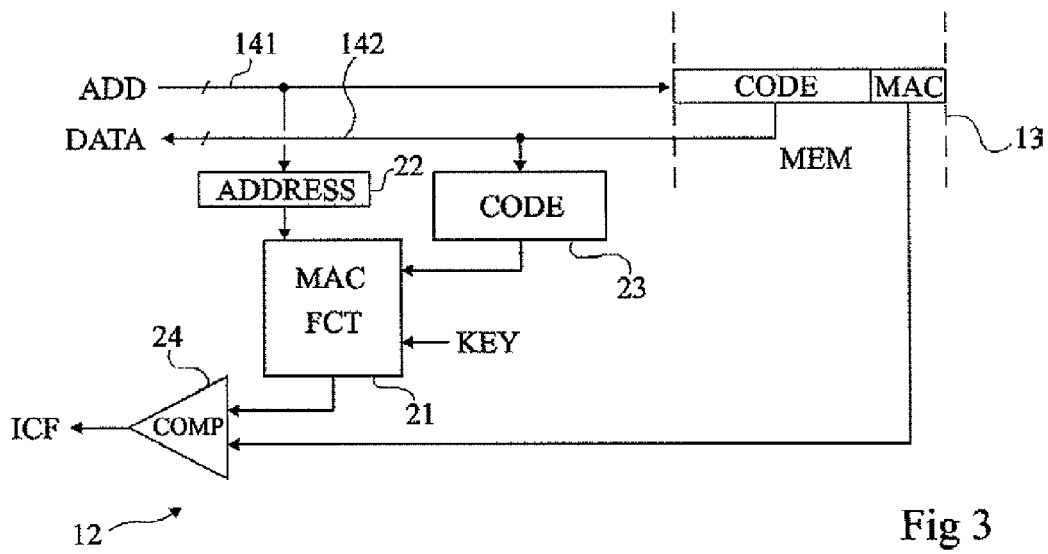
FIG. 3 very schematically illustrates the operation in read mode of an example of a conventional integrity controller.
Figure 5:
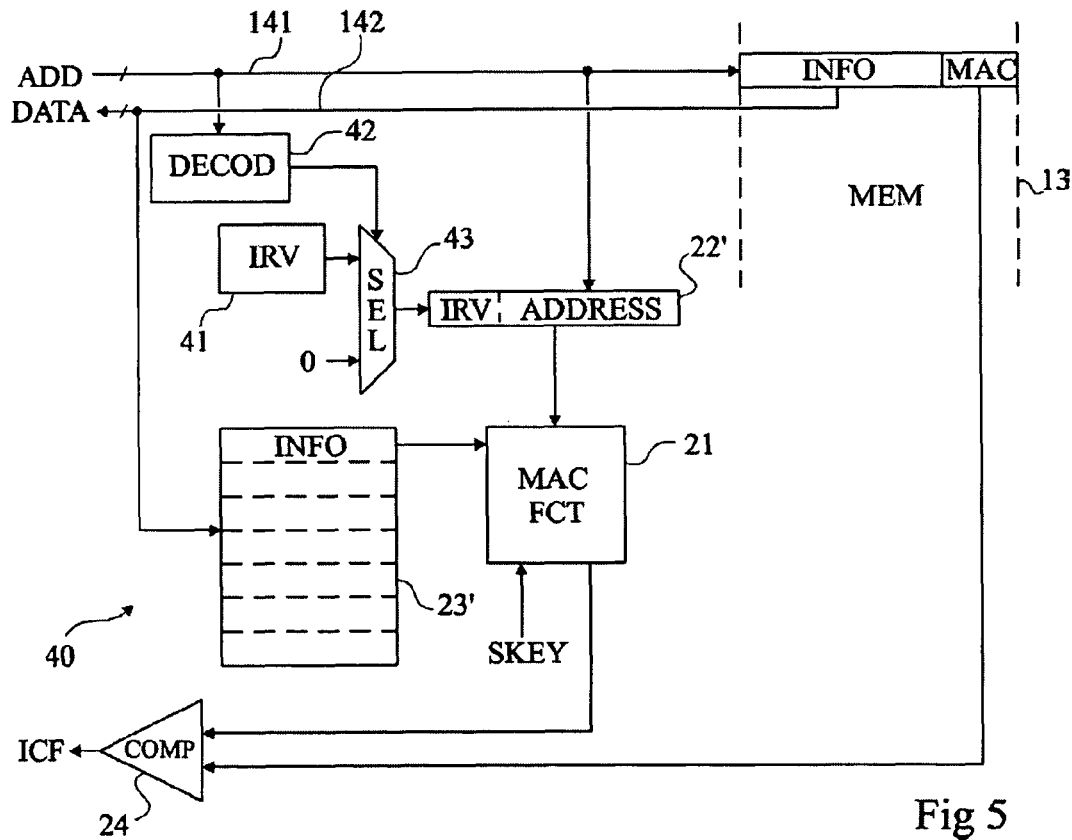
FIG. 5 very schematically shows in the form of blocks the operation of an embodiment of an integrity controller in data read mode in a memory external to a microprocessor according to the present invention.

FIG. 5 very schematically shows in the form of blocks, in a view to be compared with that of FIG. 3, a functional embodiment of integrity controller 40 according to the present invention in a phase of data reading from memory 13 (MEM). As compared with FIG. 4, a comparator 24 (COMP) providing integrity indicator ICF to the central processing unit (not shown) compares signature MAC stored with the data block in memory 13 with a current signature calculated by function 21. This current signature is obtained from address ADDRESS (at least partial), from content INFO (at least partial) of the block read from the memory, from session key SKEY and, in the case of variable data identified by decoder 42, from random value IRV having been used on storage or, in the opposite case, from a fixed value (for example, 0).

Considering the example of a counter value forming the variable to be stored in the external memory, at each counter loop, random data IRV are generated and thus have a strong probability of being modified, which prevents the possible hacker from blocking an updating of the data in the memory to use this variable again later.

The size (number of bits) to be given to random value IRV needs not be very large. A random value of several bits (for example, 8 bits) is sufficient since, even if a possible hacker tries, for example, the 256 possible values to force the system, the microprocessor will take a different session key at the first setting which will follow a first error detection. Accordingly, a new session will also be taken and will not enable the hacker to carry on with the scanning of the possible random values. Further, on resetting, the content of external memory, which is a RAM, is generally erased, as well as the random values temporarily stored by the microprocessor.

According to an alternative embodiment, the actual fingerprint (MAC) is stored in an internal memory, preferably volatile, of the microprocessor. This variation is more specifically intended for the case where the size of the fingerprint is relatively small, to be compatible with the generally limited memory sizes which are internal to a microprocessor.

Of course, the present invention is likely to have various alterations, improvements, and modifications which will readily occur to those skilled in the art. In particular, the practical implementation of the present invention, be it by hardware and/or software means based on the functional indications given hereabove is within the abilities of those skilled in the art by using tools known per se. Further, the selection of the signature calculation function according to the calculation capacities of the microprocessor and to the storage capacities as well as to the desired security level is within the abilities of those skilled in the art. Among the algorithms likely to be used for such a calculation, so-called Hash functions, parity calculations, etc. should be noted.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for recording at least one data block in a first volatile memory external to a microprocessor, comprising calculating and storing a digital signature taking into account:
    at least partially the address and the content of said data block in the memory; and
    when the address of said data block indicates variable data, at least a first random digital value internal to the microprocessor, the digital signature being associated with said data block for checking the integrity of said data block.

2. The method of claim 1, wherein a digital signature of at least one data block to be stored in the first memory takes into account at least one second fixed digital value when the address of said data block indicates non-variable data.

3. The method of claim 1, wherein said random value is randomly generated on each updating of said variable data block in the first memory.

4. The method of claim 1, wherein said random value is stored in volatile fashion in the microprocessor.

5. The method of claim 1, wherein said signature is stored, with said data block, in the external memory.

6. The method of claim 1, wherein said signature is stored in volatile fashion in the microprocessor.

7. The method of claim 1, wherein said signature further takes into account a digital key modified for each new session of a same program executed by the microprocessor and/or for each initialization thereof.

8. A method for checking the content of at least one data block read from a volatile memory external to a microprocessor, comprising comparing a signature stored on recording of said block with a current signature calculated according to claim 1.

9. A microprocessor for storing a data block in a volatile memory external to the microprocessor, comprising a source of a random digital value internal to the microprocessor; and signature calculation means for calculating a digital signature as defined by the method of claim 1.

10. A method for recording at least one data block in a memory external to a microprocessor, comprising:
    calculating a first digital signature based on at least part of an address and a content of a first data block containing variable data to be recorded in the memory, and on a random digital value internal to the microprocessor, the first digital signature being associated with the first data block for checking the integrity of the first data block; and
    storing the first digital signature.

11. A method as defined in claim 10, further comprising:
    calculating a second digital signature based on at least part of an address and a content of a second data block containing non-variable data, and on a fixed digital value internal to the microprocessor, and
    storing the second digital signature.

12. A method as defined in claim 10, further comprising generating a different random digital value on each updating of the first data block in the memory.

13. A method as defined in claim 10, further comprising storing the random digital value in the microprocessor.

14. A method as defined in claim 10, wherein the digital signature is stored with the first data block in the memory.

15. A method as defined in claim 10, wherein the digital signature is stored in the microprocessor.

16. A method as defined in claim 10, wherein calculating a digital signature is further based on a digital key modified for each new session of a program executed by the microprocessor.

17. A method for checking the integrity of a data block read from a memory external to a microprocessor, comprising:
   calculating a current digital signature based on at least part of an address and a content of a first data block containing variable data read from the memory, and on a random digital value internal to the microprocessor, the current digital signature being associated with the first data block for checking the integrity of the first data block;
   reading a stored digital signature that corresponds to the address and the content of the first data block;
   comparing the current digital signature with the stored digital signature; and
   indicating a lack of integrity if the compared signatures do not match.

18. A method as defined in claim 17, further comprising:
   calculating the current digital signature based on at least part of an address and a content of a second data block containing non-variable data, and on a fixed digital value internal to the microprocessor.

19. A method as defined in claim 17, wherein calculating the current digital signature is further based on a digital key modified for each new session of a program executed by the microprocessor.

20. An integrity controller for recording at least one data block in a memory external to a microprocessor, comprising:
   a first register to hold a content of the data block;
   a second register to hold an address of the data block;
   a source of a random digital value internal to the microprocessor; and
   a digital signature calculation unit to calculate a digital signature based on at least part of the address of the data block in the second register and the content of the data block in the first register, and, when the address of the data block indicates variable data, on a random digital value supplied by the source, the digital signature being associated with the data block for checking the integrity of the data block.

21. An integrity controller as defined in claim 20, further comprising an address decoder to decode the address of the data block and a selector responsive to the address decoder to supply the random digital value to the digital signature calculation unit when the address indicates variable data and to supply a fixed digital value to the digital signature calculation unit when the address indicates non-variable data.

22. An integrity controller as defined in claim 20, further comprising a comparator to compare a current digital signature calculated based on the content and address of a data block being read from memory, and on the random digital value, and a stored digital signature that was stored upon recording of the data block.

* * * * *